United States Patent [19]

Fortune

[11] Patent Number: 5,380,982
[45] Date of Patent: Jan. 10, 1995

[54] METALLIC CONDUCTION - HOT GAS SOLDERING-DESOLDERING SYSTEM

[76] Inventor: William S. Fortune, 29866 Cuthbert Rd., Malibu, Calif. 90265

[21] Appl. No.: 98,174

[22] Filed: Jul. 23, 1993

[51] Int. Cl.$^6$ .......................... H05B 1/00; H05B 3/42
[52] U.S. Cl. ..................... 219/230; 219/242; 228/20.5
[58] Field of Search .......... 219/230, 242, 379; 228/20.1, 20.5

[56] References Cited

U.S. PATENT DOCUMENTS

| | | | |
|---|---|---|---|
| 4,117,967 | 10/1978 | Regelsom et al. | 228/20.1 |
| 4,552,300 | 11/1985 | Zovko et al. | 228/20.5 |
| 4,620,659 | 11/1986 | Holdway | 228/20.1 |
| 4,773,582 | 9/1988 | Vella | 228/20.5 |
| 4,804,129 | 2/1989 | Brown et al. | 228/20.5 |
| 4,972,990 | 11/1990 | Abbagnaro et al. | 228/20.1 |
| 5,048,742 | 9/1991 | Fortune | 228/20.5 |

FOREIGN PATENT DOCUMENTS

| | | | |
|---|---|---|---|
| 2440005 | 2/1975 | Germany | 219/230 |
| 02-41771 | 2/1990 | Japan | 392/379 |

OTHER PUBLICATIONS

"Solder Reflow Tool", C. T. Rollman, IBM Technical Disclosure Bulletin, vol. 11, No. 10, Mar. 1969.

Primary Examiner—Bruce A. Reynolds
Assistant Examiner—John A. Jeffery
Attorney, Agent, or Firm—Daniel T. Anderson

[57] ABSTRACT

A solder-desolder system includes a hand held tool having an electrically heated soldering tip which is a hollow tube through which molten solder may be removed from the workpiece by a steady inward flow of air or by a strong impulse, vacuum stroke. Also supplied to the workpiece is a flow of solder melting hot gas which may be inert for improved soldering performance. The hot gas is directed over the heated soldering tube and may independently melt the solder or it may be utilized to preheat the work. In any event, the system provides in a compact hand held soldering tool a jet of hot air within which is a hot soldering tube tip within which a vacuum flow removes molten solder from the workpiece.

A further aspect of the solder-desolder system is a trigger in the handle of the tool which selectively connects the hollow tube to an ambient air driven venturi to provide the vacuum stroke. A base unit houses the venturi, a control circuit to remotely energize and temperature control the soldering tip heater, a gas control solenoid value, and a solenoid value to control the operation of the gas driven venturi. A rest switch in a cradle, for the hand held tool, deactivates these gas and/or air flow functions when the tool is at idle and is placed by the operator onto the cradle portion of the base unit.

11 Claims, 7 Drawing Sheets

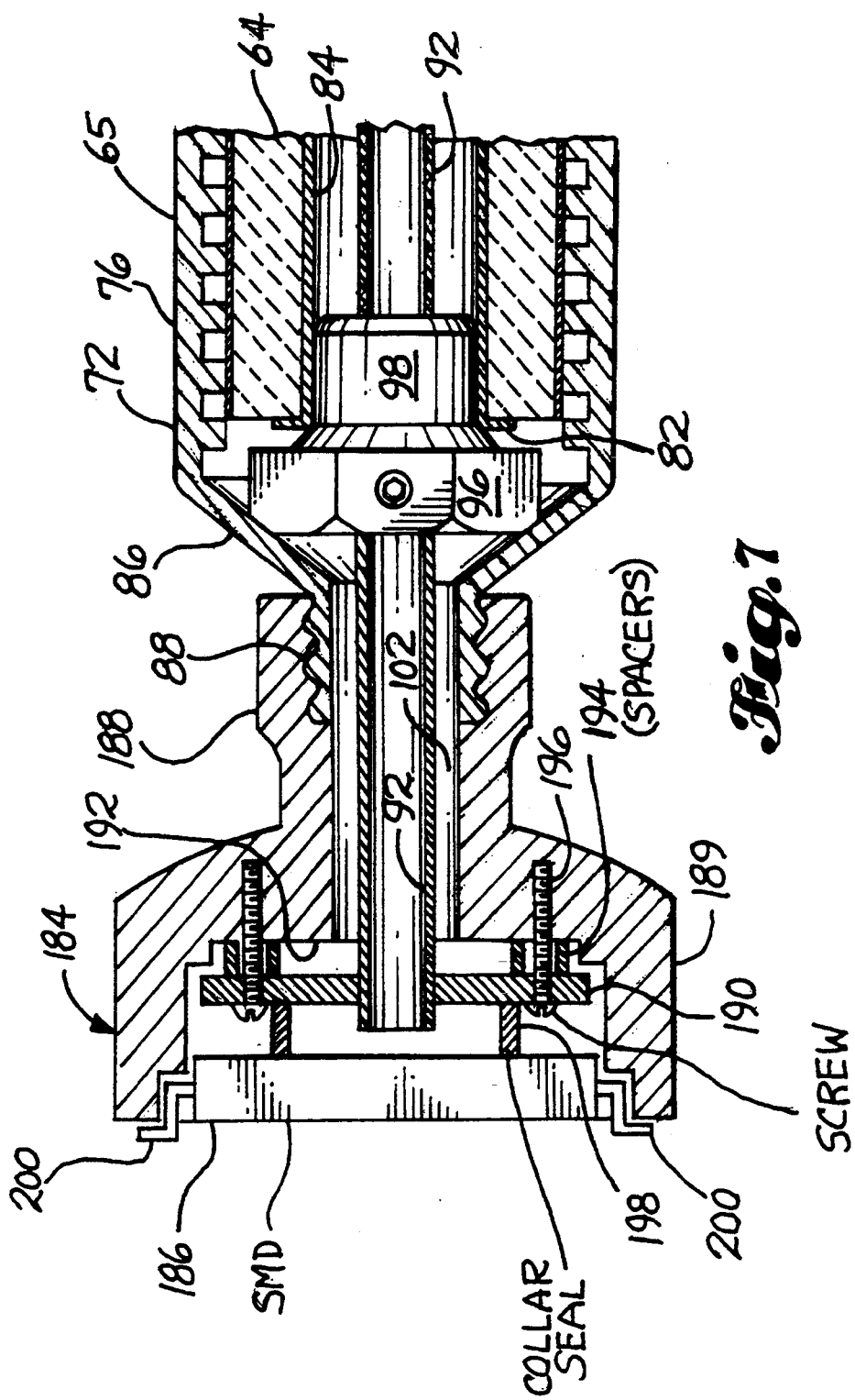

METALLIC CONDUCTION - HOT GAS SOLDERING-DESOLDERING SYSTEM

BACKGROUND OF THE INVENTION

This invention relates generally to the field of hand held soldering/desoldering tools and, more particularly, to such instruments which in part utilize a stream of gas and in part metallic conduction to convey heat from its source along a path to the soldering point, the term "hand held" being intended to include robotic or robot-like applications. The term "gas" as used here usually means ambient air, but may include inert or relatively inert gases such, for example, as carbon dioxide or nitrogen or the noble gases or the like as when oxidations, corrosive reactions, or other undesired chemical action is to be minimized.

The advantages of hot gas soldering have become known and understood in recent years and are discussed in detail in Applicant's United States Patents: HOT AIR SOLDERING AND RESOLDERING SYSTEM, No. 4,926,028; HOT GAS SOLDERING SYSTEM, No. 5,054,106; and HOT GAS SOLDERING INSTRUMENT, pending patent application ser. No. 08/14361, filed Feb. 5, 1993, by this applicant. Hot gas soldering by a stream of very hot gas with a small cross section can apply precisely the desired quantity of heat at the desired work point without deleteriously heating other adjoining or contiguous material or objects. In addition, the gas stream presents to the work point a substantially constant temperature heat source—unlike a conventional soldering tip the temperature of which inherently varies somewhat as varying amounts of heat are drawn therefrom and then replenished along a metal conduction path. A related advantage is that the gas may be heated instantly as it flows across, in heat exchange relation, the heat source and is instantly applied to the work point while a conventional soldering tool, exhibiting a significantly greater degree of thermal inertia, requires that heat be conducted through the solid components of the tool until the tip, inherently at some distance from the source, reaches a temperature adequate for working.

It may also be pointed out that by hot gas techniques, a low thermal inertial metallic soldering tip may be heated by an internally directed stream of hot gas providing most of the above advantages. In addition, although the soldering action is more like conventional soldering, the tip may be very desirably of iron composition since copper is not needed for its high thermal conductivity. Thusly avoided are the weight and expense of copper and its plating as well as its high vulnerability to decay by chemical reactions aggravated by its' intense thermal environment.

These and other advantages of hot gas soldering have not been fully achieved in the prior art because of the difficulty of generating the gas stream, satisfactorily heating it and providing means for shaping it and directing it upon the work point. Furthermore in a solder-desolder station having maximum versatility, it is desirable to be able to melt solder by direct metallic conduction and to draw away the unwanted solder, or its surplus, without cooling the workpiece or suffering the premature solidification of the unwanted solder.

It is accordingly an object of the present invention to provide an integrated solder-desolder instrument which achieves the advantages and versatility of melting solder by hot gas as well as by direct metallic solder tip contact and provides vacuum solder removal without cooling the workpiece, drawing oxygen or otherwise contaminating ambient air thereover, or having the molten solder solidify in the vacuum nozzle or duct.

It is another object to provide such a system which substantially instantly generates and applies to a work point a hot gas stream of predetermined cross section at a temperature of the order of 1500 degrees Fahrenheit and with a predetermined desired rate of heat energy flow to the work point.

It is another object to provide such a system in which the gas supply to the soldering instrument may be somewhat preheated by the electrical conductors conveying power to the heating element and in which the soldering instrument handle is cooled by the flow therethrough of the gas.

It is another object to provide gas heating apparatus for such a system which is exceedingly effective and efficient in supplying a very high temperature stream of air for soldering.

It is another object to provide such a system which is structurally simple, reliable, mechanically rugged, and inexpensive to manufacture.

It is another object to provide such a system in which the temperature of the heating element is electronically controlled remotely from the body of the soldering instrument itself.

SUMMARY OF THE INVENTION

Briefly these and other objects are achieved in accordance with the structural aspects of a presently preferred example of the invention which includes an electrically heated, hand-held solder-desolder tool having a cylindrical barrel with a forward nozzle end and a closed rear-end and a hollow cylindrical heating element carried co-axially within the barrel. A duct connects with the closed rear-end of the barrel for supplying a pressurized gas, which may be air or an inert gas, into the barrel over the heating element and ultimately out its forward, nozzle end.

A metallic heat collector having a hollow tube extending forwardly is disposed at least partially within the hollow cylindrical heating element with the tube extending axially through the nozzle at the front of the barrel. The gas is forced from the input duct over the heating element in a helical heat exchange channel over the heat collector, and over its forwardly extending metallic tube and out the nozzle where it may be directed upon the workpiece for melting solder.

The interior of the metallic tube communicates with a vacuum chamber formed in the closed, rear-end of the barrel so that when a vacuum is created therein, molten solder may be drawn thereinto through the metallic tube.

The barrel of the tool may be provided with a handle which carries a trigger actuated valve to connect a gas driven venture with the vacuum chamber when a vacuum pulse is desired. The same gas supply may be coupled to the input duct of the barrel to provide the gas to be heated for the soldering or desoldering processes.

In addition to the barrel and its handle, a base unit is included which provides a resting cradle for the tool when it is not in actual use. The base includes a control circuit and power supply for remotely controlling the electric heating element. Also housed in the base is a gas control solenoid and flow control for the soldering gas and a solenoid control and the gas driven venturi to provide the desoldering vacuum. The cradle mechanism for holding the tool includes a rest switch whereby when the idled instrument is placed in the cradle, the solenoid valves are operated to inactivate the pressurized gas supply and the air supply, when separate, for the venturi.

It may be noted that in this particular embodiment, the hose that carries the soldering gas to the handle and thence to the barrel of the tool may also carry the electric lines between the base unit and the handle of the tool.

DESCRIPTIVE LISTING OF DRAWING FIGURES

FIG. 7 is a similar view of the solder-desolder tip portion of a still further example of the invention.

DETAILED DESCRIPTION OF PREFERRED EMBODIMENT

Figure 1:
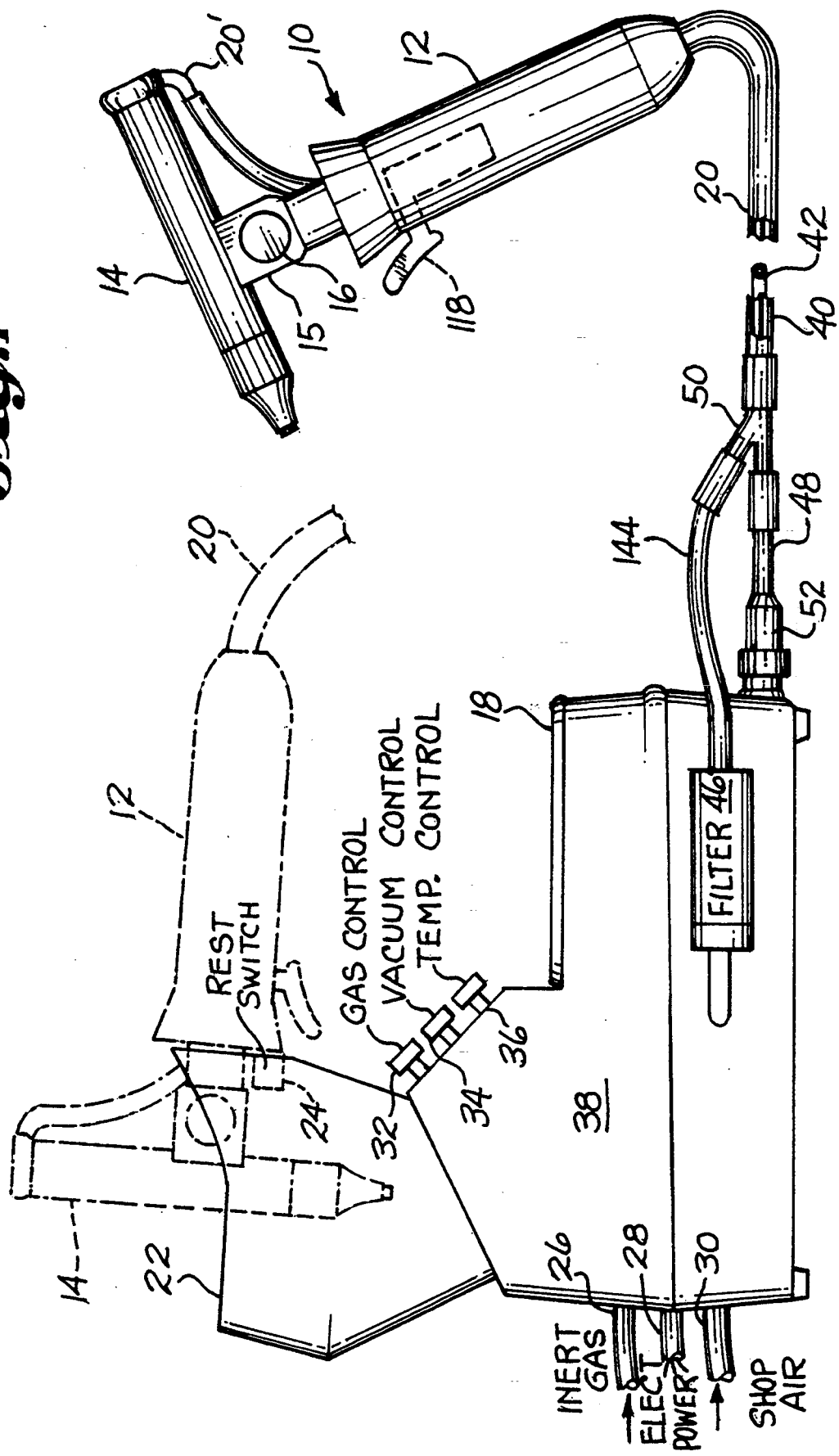
FIG. 1 is an overall pictorial and schematic view of an example of a metallic conduction—hot gas soldering-desoldering tool system constructed in accordance with the principles of the present invention.
Figure 2:
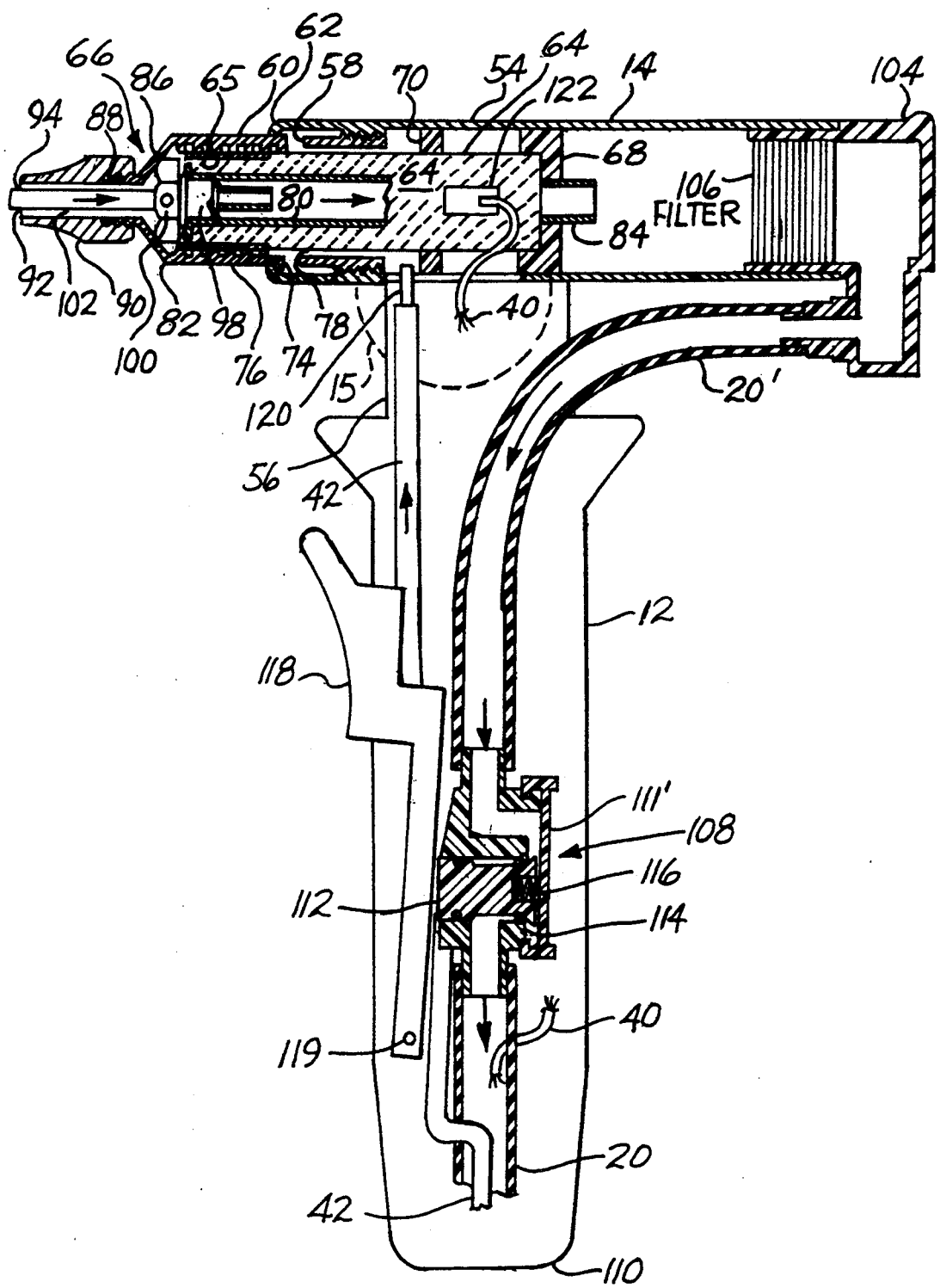
FIG. 2 is a sectional view of the working head portion of the tool system of FIG. 1.
Figure 3:
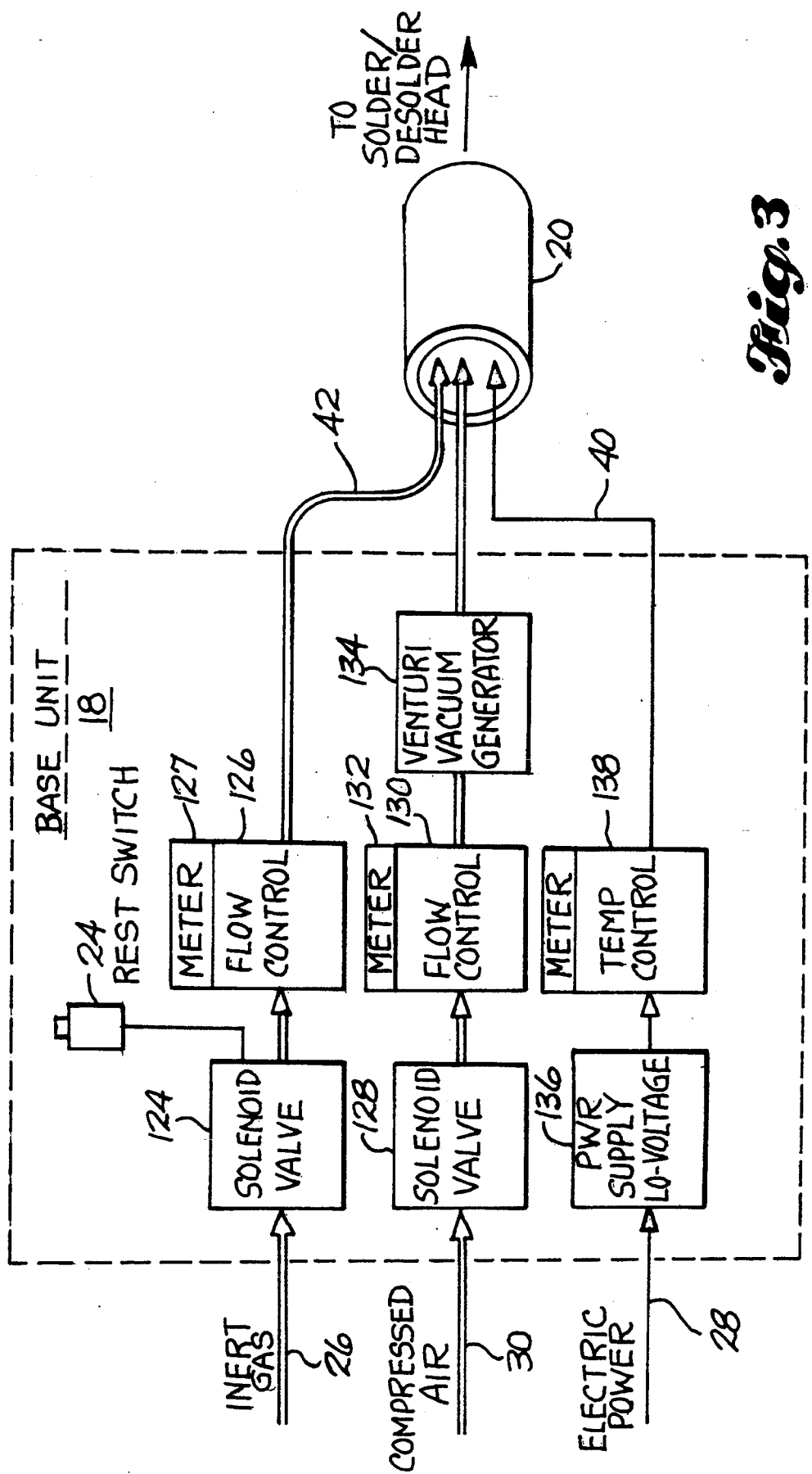
FIG. 3 is a schematic diamgram of the air, gas, vacuum, and electric supply of the tool system of FIG. 1.

The example of the invention illustrated in FIGS. 1, 2, and 3 incudes a hand held soldering instrument 10 having a handle portion 12 and a solder-desolder working head 14 pivotally, adjustably connected together by a head support bracket 15 and shaft 16. The instrument 10 is coupled to a base unit 18 by a combination hose and electric cable 20. The base unit includes a cradle portion 22 for receiving and holding the instrument 10 as shown by the broken lines in the figure. When the instrument 10 is not cradled, a rest switch 24 mounted in the cradle portion 22 is operated to deenergize major portions of the instrument 10 as described below. The base unit 18 houses various valves, controls, power supplies, and a venturi vacuum generator and has an input connection 26 for an inert gas or a substantially inactive gas such as nitrogen which may be supplied in a conventional manner such as a commercial gas cylinder, not shown. A connection 28 is provided for supplying standard electrical power; and a connection 30 is of the character to receive a standard supply of shop air in the appropriate manner.

A gas control valve 32 permits the operator to select the desired magnitude of flow of the inert gas through the hose 20 to working head 14; and a vacuum control valve 34 similarly is mounted in the base unit 18 whereby the operator may control the magnitude of airflow associated with a vacuum utilizing desoldering operation of the working head. A temperature control 36 is also carried by the base unit 18 whereby the operator may select a desired temperature for the electric soldering heater in the working head. The temperature control may desirably be of the character described in U.S. Pat. Nos. 4,507,546 and 4,734,559 issued to William S. Fortune and Wayne A. Murray. The temperature of the soldering heater is remotely controlled by a supply circuit which uses for a very short portion of the period of each cycle, including the inflection point, of the applied alternating current to effect a resistance measurement of the electric heating element the magnitude of which is a function of its temperature. A signal representative of the instantaneous value of the resistance is then generated which is used in a feedback mode to control the current flow to the heating element to cause it to be maintained at a predetermined desired temperature. Thusly, without a separate sensor in the working head and without separate leads being used for a temperature feedback signal, essentially full wave power may be continuously supplied to the heater. Alternately, however, a conventional separate sensor technique may be utilized when desired.

The body portion 38 of the base unit 18 houses, in this example, all the power supply and control electronics along with a vacuum generator operating, in this example, as a venturi powered by the shop air and the controls for the supply and flow of the inert gas all as indicated on the schematic diagram of FIG. 3.

The combination hose and electric cable 20 carries 3 electric lines 40, including a ground, for supplying low voltage power to the heater in the working head 14. A smaller hose 42 carries the inert gas to the working head 14; and the general interior of the hose 20 carries the desoldering vacuum stroke air flow back through the hose branch 44 and the filter 46 and returns it to the shop air-driven venturi within the body portion 38 of the base unit. The electric lines 40 and the small, gas line 42 are carried within the hose branch 48, which is otherwise blocked at the Y-connector 50, and through the connector 52 into the body portion 38.

In FIG. 2 the details of the structure of the working head 14 and the handle portion 12 are seen to include an outer housing barrel 54 affixed by its bracket 15 to the body 56 of the handle 12. The forward end 58 of the barrel 54 has a reduced diameter and is externally threaded to receive an internally threaded retaining collar 60 which, in turn, has a forward end reduced diameter portion forming a retaining shoulder 62. The function of the retaining collar is to secure a hollow cylindrical heating element 64 and solder-desolder assembly 66 within the barrel 54. The heating element 64 is retained at its rear end by a fixed, Teflon bushing 68 and by a second, annular Teflon bushing 70 disposed and spaced axially forwardly thereof. At its forward end, the heating element 64 is supported by an end cap member 72 which has an outwardly extending flange 74 at its rear end engaged by the inwardly directed retaining shoulder 62 of the collar 60. The inner surface of the body of the end cap member 72 is formed with a helical recess forming a heat exchange channel 76 along a major portion of the outer surface of the heating element; and an annular space 78 is provided between the inner wall of the forward, threaded end of the barrel 54 and the outer surface of the heating element 64. A metal tube 80 is disposed snugly within the heating element and extends from its outwardly directed flanged forward end 82 to its rear end 84 beyond the fixed, Teflon bushing 68.

The forward portion 86 of the end cap 72 is formed to provide an inwardly, forwardly converging frusto-conical surface for retaining the solder-desolder assembly (as described below) and the heater element and is terminated at its forward end by a reduced diameter externally threaded neck 88 for holding an internally threaded desoldering tip 90.

The solder-desolder assembly, in this example includes 1) a hot tube 92 extending from its front tip 94 just forward to the front end of the desoldering tip 90 to a point 95 well within the hollow cylindered heating element 64 and 2) a heat exchange and support bushing 96. The bushing 96 includes a rear body portion 98 having an outer diameter approximately equal to the inner diameter of the heater element 64 and is disposed therewithin in heat exchange relation therewith. The forward portion of the heat exchange and support bushing 96 is an enlarged diameter octagonally shaped body 100 which is axially pressed into and retained snugly against the flange 82 of tube 80 by the end cap member 72. The "flats" of the octagonally shaped body 100 provide a continuation of the heat flow path from the helical channel 76 to the annular space 102 between the outer surface of the hot tube 92 and the inner surface of the desoldering tip 90. It may be noted that the actual electrically resistive heating material 65 is deposited about the forward end of the ceramic base structure of the element 64.

A removable plastic end cap 104 closes the rear of the barrel 54 and retains a filter element 106 which is removable for cleaning and replacement. The end cap 104 provides coupling to a rubber-like hose 20' which connects through a valve 108 in the handle portion 12 to the combination hose-electric cable 20 at the base end 110 of the handle. The valve 108 includes a valve body 111 and a plunger 112 with a frustoconical closure portion thereof engaging a valve seat 114. The valve is normally held in a closed condition by a compression spring 116 retained between the plunger 112 and the valve body 111. The valve 108 is opened, when desired by compressing a trigger element 118, carried by the handle portion 12 and pivoting at a pin 119 causing an inward displacement of the plunger 112 against the spring 116.

The path of the inert gas from the base unit 18 through its small hose 42 within the combination hose 20 may be seen in FIG. 2 to pass out through the wall of the hose 20 ahead of the valve 108 in the handle portion 12 and to a connector 120 into the annular space in the working head 14 outside of the heating element 64 from whence it may progress forwardly over the heater, through the helical channel 76, over the flats 100 of the octagonal bushing 96, through the annular channel 102 along the hot tube 92, and out the forward end of the desoldering tip 90.

Similarly, the electric lines 40 pass through the wall of the hose 20 ahead of the valve 108 and are fed through the handle portion 12 to the interior of the working head barrel 54 for the connection 122 to the heating element 64.

In FIG. 3, the functional components housed within the base unit 18 are shown in a schematic manner to include the inert gas connector 26 and a solenoid valve 124 operated by the rest switch 24 such that the valve 124 is opened when the instrument 10 is lifted from the cradle portion 22 of the base unit 18. The inert gas then may flow through a manually operated flow control 126 which may be monitored in a conventional manner by a flow meter 127 carried on the face of the base unit 18. Alternately, the flow control 126 may have a calibrated dial or knob to indicate at least approximately the magnitude of flow of the gas. The gas output of the flow control 126 is coupled to the inert gas hose 42 and into the combination hose 20 for supply to the instrument 10.

Similarly, shop, compressed air from the connector 30 is turned on by a solenoid valve 128 operated by the rest switch 24 and is then controlled by a flow control 130 and meter 132. The output of the flow control 130, in this example, powers a venturi vacuum generator 134 whose output is coupled to the general interior of the combination hose 20 from whence it is coupled through the valve 108 in the handle portion to the hose 20'' and thence to the interior of barrel 54 through its rear end cap 104.

The electrical power supplied through its connector 28 is fed to a power supply circuit 136 having a basic or master on-off switch for energizing, for example, the solenoid valves and a temperature control circuit and meter 138 of the character described above and, in turn, the heater element 64 through the leads 40.

In operation, the operator may first electrically energize the system and select the desired temperature with the temperature control 138 for the heating element 64 and, thereby, the temperature of the heated gas and the hot tube 92 for soldering or desoldering operations at the working tip of the instrument 10. Similarly, the desired flow rate of the inert gas and the vacuum parameters are set by the controls 126, 130, respectively. The instrument may then be lifted from its cradled position to start the flow of inert gas and to provide a vacuum, for any desoldering operation.

The operator may preheat the workpiece with the hot inert gas as it forms a hot jet at the nozzle of the tip 90 and then contact the work with the hotter hot tube 92; or the solder melting may be done entirely by the hot gas, as desired by the operator. In either mode, the heated solder area is isolated from the ambient atmosphere by the covering of inert gas and thus are realized the advantages of non-oxidation of the heated solder or the soldering tip. Furthermore, much less, or no, flux is required thereby greatly reducing the level of noxious fumes from vaporizing and burning flux. Of greatest import, however, is the quality of soldering achievable when done under an inert blanket of heated, and therefore non-cooling, gas. These advantages become especially important in micro circuitry soldering and reworking and in many robotic applications.

When excess solder is to be removed, the trigger 118 is depressed by the operator to draw the molten solder into the hot tube 92 and thence into the chamber in front of the filter 106 within the barrel 54.

Figure 4:
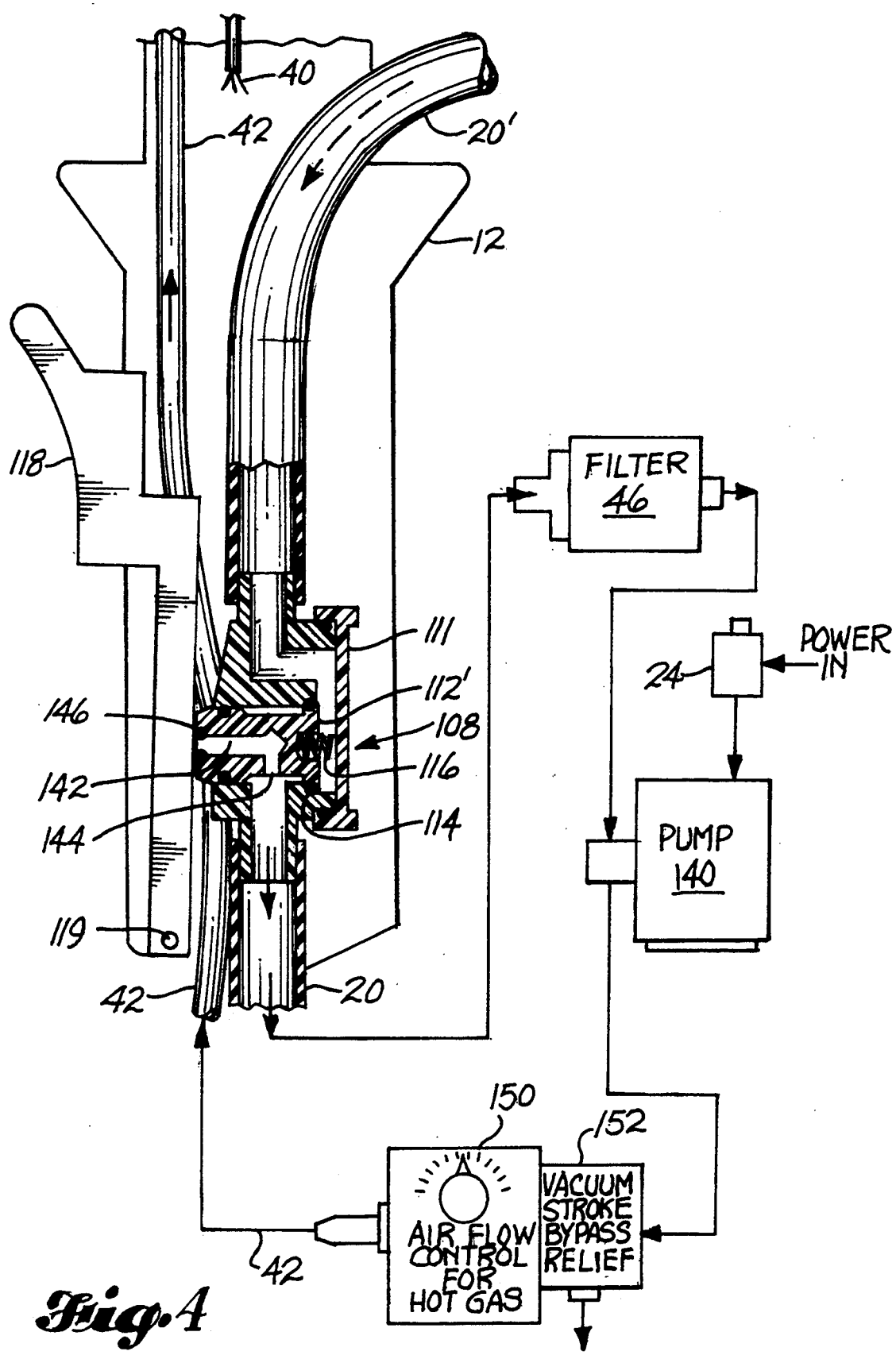
FIG. 4 is a partially schematic, partially sectional view of portions of an alternative example of the invention.

In FIG. 4 an example of the invention is illustrated in which the hot gas is from the ambient air and in which a single pump 140, which may be housed in the base unit 18 and powered through the rest switch 24, supplies both the flow of air for hot gas soldering as well as high volume air flow for a vacuum stroke for desoldering. In this example, the working head 14, the hand held portion 12, and the temperature control circuitry may be identical in all detail to that shown and described above except for a minor mechanical variation in the triggered valve 108: the valve plunger 112' is ported by a duct 142 therethrough which provides an air passage from the general interior of the hose 20 to the ambient atmosphere by interconnected bores. A small bore 144 is provided in line with the hose 20 and a small bore and seal ring 146 are provided along the axis of the plunger 112' opening to the atmosphere under the body of the trigger 118.

Accordingly, in normal solder melting operation, ambient air is drawn into the plunger 112' and thence into the hose 20, through the filter 46 and into the electric pump 140. From the pump 140, the air under positive pressure is fed to the hose 42 through an air flow control for hot gas 150. For hot air solder melting, the operation for the operator is as with the previous example. When, however, the operator wants to remove molten solder from the workpiece, the trigger 118 is depressed which closes the port 146 and opens the main valve at its valve seat 114. This action permits the pump 140 to draw a large volume of air through the hot tube 92 and the hose 20 back to the pump 140. The pump, in this mode, is exhausted through a relief valve type of vacuum stroke bypass valve 152.

Figure 5:
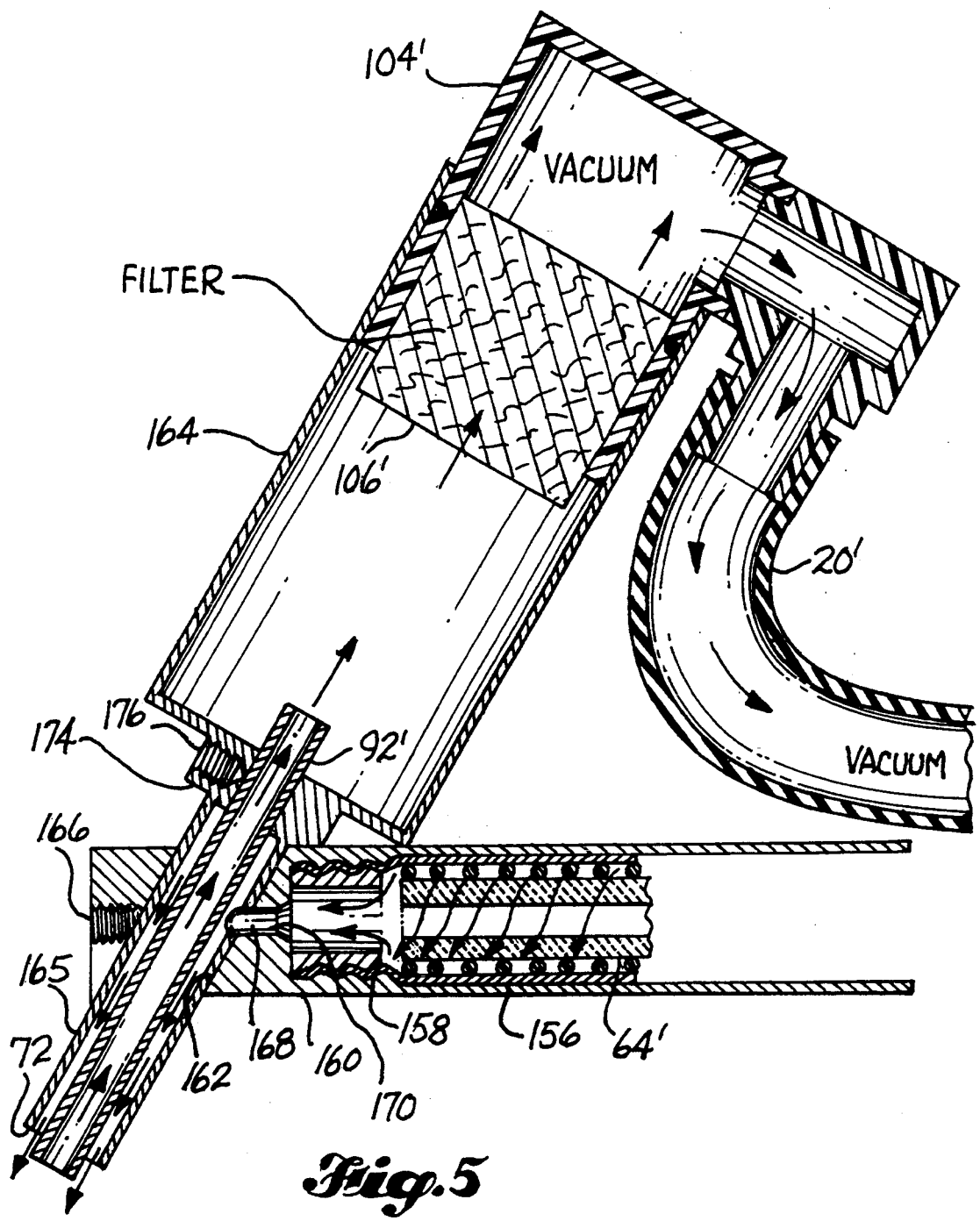
FIG. 5 is a sectional view of portions of the working head of a further example of the invention.

Referring to FIG. 5, an example of the invention is illustrated in which the solder melting hot tube 92' is not coaxial with the heating element 64' and may be mounted upon and combined with a more conventionally configured hot air soldering tool. In this example, the gas is heated by its flow through a helical channel 154 over the outside of the cylindrical heating element 64'. A housing sleeve 156 for the heater element is terminated at its front end by an externally threaded nose portion 158. A metallic, heat conductive adapter sleeve 160 is threaded over the nose portion 158 and extends forwardly with an oblique retaining bore 162 provided therethrough. A desoldering chamber 164 having a supporting sleeve 165 affixed to its forward end extends through the retaining bore 162 and is removably affixed thereto by a set screw 166. The interior of the sleeve 165 is provided with a port 168 in register with an axial bore 170 in the conductive sleeve 160 to provide a passage for gas heated in the helical channel 154 to the soldering tip 172 of the sleeve 165. The highly conductive bushing 174 within the supporting sleeve 165 supports, in turn, a hot tube 92' and is retained by a set screw 176.

A filter 106' and a removable end cap 104' connected to the vacuum line 20' complete the structure unique to this example; and, in operation, the hot tube 92' and the hot gas directed forwardly thereover to the workpiece, and the operation of the vacuum apparatus to remove molten solder is the same as described above in connection with the previous example.

Figure 6:
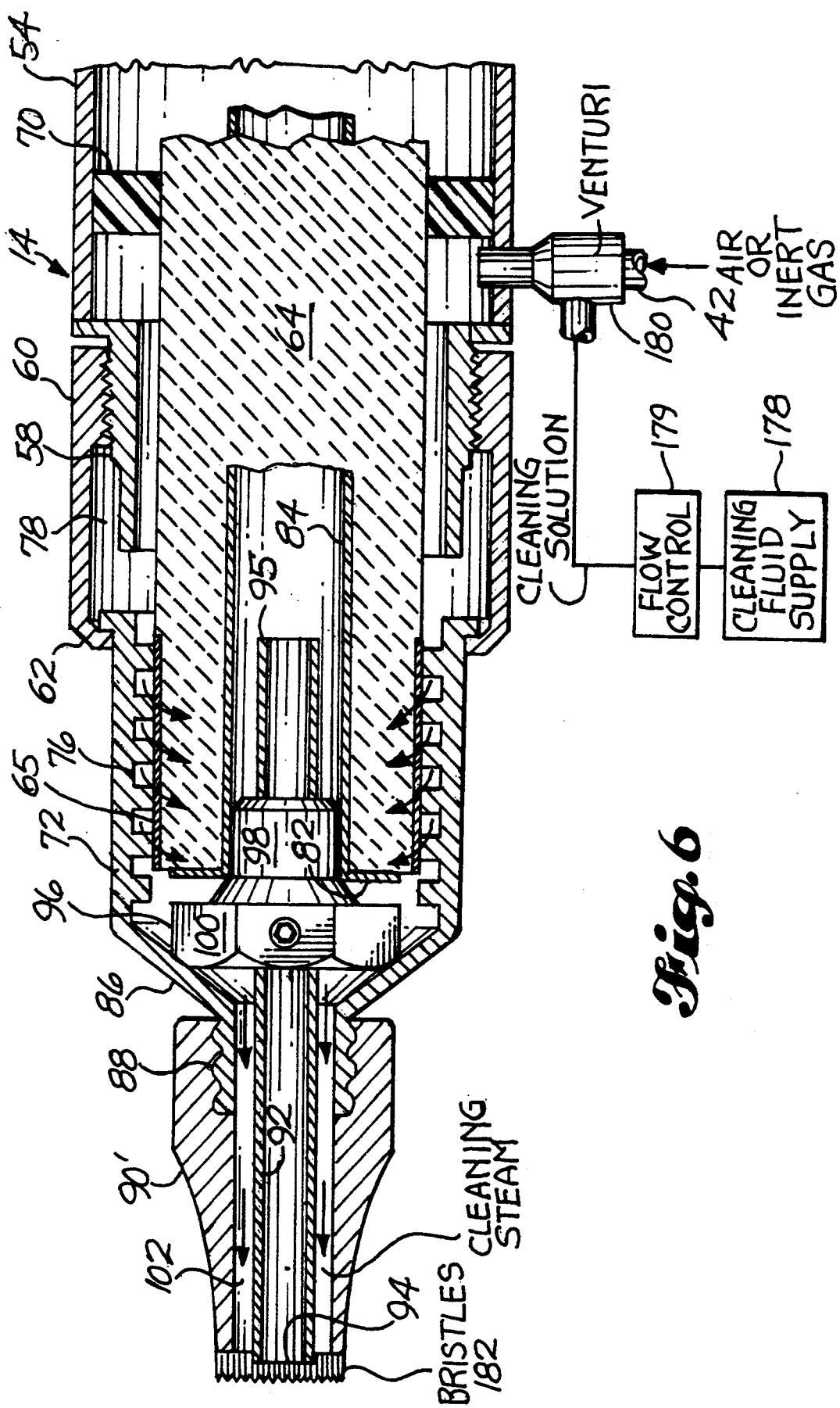
FIG. 6 is a similar view of yet a further example of the invention.

In FIG. 6 an example of the invention is illustrated in which a cleaning solution such as distilled water or a desired chemical may be vaporized and applied to the workpiece in preparation for a soldering step or in finishing a soldering or desoldering operation. The structure of the apparatus may be identical to that of FIGS. 1, 2, and 3 except that provision is made for injecting the desired fluid into the gas flow ahead of the heating element 64. In a presently preferred embodiment the fluid is supplied from a reservoir 178, through a flow control 179 adjusted by the operator, and into a venturi 180 powered by the flow of soldering gas in the hose 42 as it enters the working head 14. As the fluid traverses the helical channel 76, it vaporizes and is ejected as hot vapor on the workpiece. Such cleaning, as a preparatory step to soldering, can eliminate and will at least minimize the amount of flux required. To facilitate such cleaning, the tip 90' may be provided with appropriate scrubbing bristles 182 as shown.

In FIG. 7 a further example of the invention is illustrated in which the tip 90 is replaced with a tip 184 especially adapted for desoldering and removing surface mounted devices such as the SMD 186 shown as the workpiece in the figure. The tip 184 includes a heat conductive outer body 188 which threads onto the external thread 88 of the end cap member 72. The outer, or forward, end 189 of the tip 184 is enlarged and shaped to envelop the SMD 186. A spreader element 190 is disposed within the end 189 and is spaced from the bottom 192 of the enveloping end 189 by a set of spacers 194 which may surround and be supported by mounting screws 196. A short, hollow cylindrical or collar sealing member 198, preferably fabricated of a heat resistant elastomeric material, is affixed to the face of the element 190. The desoldering hot tube 92 extends through the spreader element 190 and communicates with the space within the collar member 198 and the SMD 186 in a manner to evacuate that space when the trigger 118 is pressed to create a vacuum stroke within the hot tube 92.

In operation, hot gas, as in the previous examples, is forced through the annular space 102 to the spreader plate 190, thence over its periphery to melt the solder on the terminals 200 on the SMD 186 while the collar sealing member 198 isolates the thermally delicate body of the SMD from the hot gas. When the solder on the terminals 200 is molten, the trigger 118 may be pressed to create a vacuum in the hot tube 92 which draws the DMS 186 against the sealing member 198 so that the desoldered SMD may be lifted away from its circuit board. The DMS may then be deposited wherever desired by releasing the trigger 118 and permitting the SMD to drop from the sealing member 198.

There have thus been disclosed and described various examples of the invention which exhibit the advantages and achieve the objects set forth above.

I claim:

1. An electrically heated solder-desolder tool comprising:
    a cylindrical barrel having a forward nozzle end and a closed rear end;
    a hollow cylindrical heating element housed coaxially within said barrel;
    duct means for feeding a pressurized gas into said barrel and out its said forward nozzle end;
    gas heating means disposed annularly between said barrel and said heating element and axially between said duct means and said nozzle end;
    a metallic heat collector disposed at least partially within said hollow cylindrical heating element in effective heat exchange relation therewith;
    a hollow metallic tube member disposed radially within said heat collector and extending forwardly therefrom into said forward nozzle end of said barrel substantially concentric therewith and forming a forwardly directed hot gas passageway in an annular cylindrical space defined therebetween, said tube member extending forwardly to be at least axially substantially coextensive therewith whereby said pressurized gas flows in said gas heating means, through said passageway, and is ejected forwardly out of said nozzle end as a solder melting jet of heated gas;
    a vacuum chamber disposed within said barrel rearwardly of said heating element and communicating through the interior of said hollow tube member with said nozzle end in a gas flow relation; and
    vacuum means selectively coupled to said vacuum chamber for drawing molten solder from said nozzle end thereinto.

2. The invention as set forth in Claim 1 in which said gas heating means includes a helical channel extending axially along and over an electrically energized portion of said heating element.

3. The invention as set forth in Claim 1 in which said tube member extends forwardly of said nozzle end by a fraction of its diameter.

4. The invention as set forth in Claim 1 which further includes a base unit comprising:
- a body member including cradle means for holding said barrel when the tool is not in use;
- soldering gas control means for supplying said pressurized gas to said duct means;
- vacuum control means for providing a vacuum creating flow to said vacuum means of said barrel;
- temperature control means for energizing and remotely controlling the temperature of said heating element; and
- unitary hose and cable means for coupling said soldering gas control means, said vacuum control means, and said temperature control means to said barrel.

5. The invention as set forth in Claim 4 which further includes a rest switch operable by said barrel when removed from said cradle means for enabling said vacuum and gas control means.

6. The invention as set forth in Claim 5 in which said rest switch is coupled to said soldering gas control means and said vacuum control means whereby said pressurized gas and said vacuum are enabled upon actuation of said switch.

7. The invention as set forth in Claim 5 in which vacuum control means includes an air driven venturi.

8. The invention as set forth in Claim 4 which further includes:
- a handle body affixed supportingly to said barrel;
- vacuum valve means disposed within said handle body and coupled between said vacuum chamber and said vacuum control means; and
- trigger means carried by said handle body selectively impressing a vacuum condition in said vacuum chamber.

9. The invention as set forth in Claim 8 in which said vacuum valve means includes air bleeding means operable by said trigger means to selectively permit a flow of ambient air therethrough back to said vacuum control means only when said vacuum valve means is closed.

10. The invention as set forth in Claim 8 which further includes cleaning liquid injection means coupled to said duct means for providing a flow of such liquid through said gas heating means for substantial vaporization thereof.

11. The invention as set forth in Claim 10 in which said injection means includes venturi means driven by said flow of pressurized gas and which further includes a cleaning liquid supply and liquid flow control means for coupling said supply to said venturi.

* * * * *